Feb. 25, 1930. A. G. GIRARD 1,748,122
SHIPPING DEVICE
Filed Aug. 3, 1925
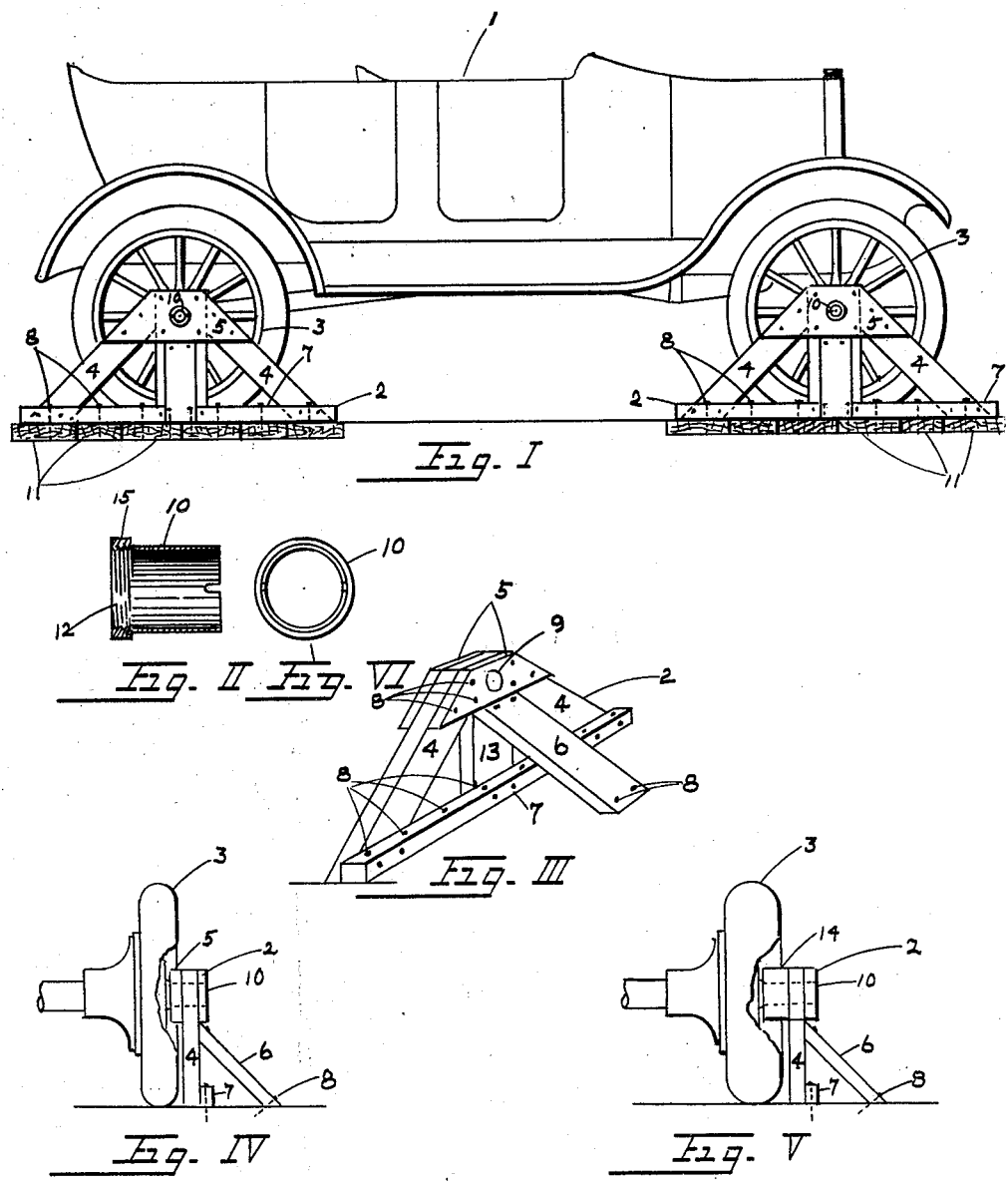
INVENTOR.
ARTHUR G. GIRARD
BY
ATTORNEY.

Patented Feb. 25, 1930

1,748,122

UNITED STATES PATENT OFFICE.

ARTHUR G. GIRARD, OF TOLEDO, OHIO, ASSIGNOR TO THE WILLYS-OVERLAND COMPANY, OF TOLEDO, OHIO, A CORPORATION OF OHIO

SHIPPING DEVICE

Application filed August 3, 1925. Serial No. 48,011.

This invention relates to vehicle shipping devices and one of its objects is to provide an improved means of securing and bracing a vehicle on the floor or deck of a railway freight car in a manner to firmly secure it against displacement while in transit.

Another object of the invention is to provide an improved bracket for securing a vehicle support to the floor or deck of a freight car.

Another object of the invention is to provide an improved means of securing a vehicle in a freight car having a floor or deck composed of a plurality of boards.

Another object is to provide a means of securing a vehicle to the floor or deck of a freight car, so that the securing means will not be rendered inoperative by a partially decayed or broken floor board.

A further object is to provide a bracket for securing a vehicle to the floor or deck of a freight car that obviates the use of metal restraining straps.

In the accompanying drawings, Figure I is a side elevation of a vehicle supported by one form of the invention, the freight car floor being shown in section beneath each of the wheels.

Fig. II is a sectional view of the nut that replaces the vehicle hub cap when the improved bracket is used.

Fig. III is a perspective view of the improved bracket.

Fig. IV is a front elevation of the bracket showing the manner in which it is installed on a vehicle wheel.

Fig. V is a front elevation similar to Fig. IV but illustrating the adaption of the bracket to a wheel with a larger tire, by the use of a wider cleat member.

Fig. VI is an end view of the nut shown in Fig. II.

Referring to the drawings in which the same numerals refer to the same parts throughout the several views, 1 is a vehicle which is supported by a bracket 2 at each of its wheels 3.

Bracket 2 is preferably made of wood and consists of side stays 4, upright 13, cleats 5, brace 6 and bottom member 7, all of which are secured together in the manner shown, by nails 8, or other suitable fastening means. The assembled bracket, which is similar in appearance to a side braced truss has a cylindrical opening 9 in its upper portion which is of sufficient size to receive nut 10, and is positioned, with respect to the floor boards 11, so that the wheels 3 may be engaged at the desired height.

Nut 10 is threaded at 12 to engage with the wheel hub (not shown), one nut being installed on each wheel. After the nuts 10 are secured to the wheels, brackets 2 are pushed over the nuts until inner cleats 6 engage flanges 15 on nuts 10. The brackets 2 are then secured to floor boards 11 by nails 8 or other suitable means.

Freight car floors are usually constructed of a plurality of boards 11 placed edge to edge, and because of variation in the quality of the material used, or because of decay, it frequently happens that one or more of the boards break while the car is being used to transport vehicles. Breakage of floor boards often results in brackets being torn from position, and to reduce the effect of the failure of an individual floor board, bottom member 7 is provided throughout its length with a plurality of nails 8 so that at least one nail is driven through the bottom member into each of the floor boards 11.

It is desirable that the tire portion of wheel 3 should not contact with the bracket and to adapt the bracket to the use of tires with greater cross section than that shown in Fig. IV, an inner cleat of greater thickness is used as shown at 14 in Fig. V.

It may be seen from the foregoing description that the bracket described may be constructed of non-metallic members secured together, by nails or other well known means, so as to support and brace a vehicle for shipment in a freight car having a floor which is unsuitable for the use of ordinary brackets.

While I have shown somewhat in detail certain embodiments of my invention, it is to be understood that this showing and description are illustrative only, and that I do not regard the invention as limited to the details of construction illustrated and described, except in so far as I have included such limitations within the terms of the following claims, in which it is my intention to claim all novelty inherent in the invention broadly as well as specifically.

I claim as my invention:

1. In a device for the purpose set forth, in combination, a standard having an opening adjacent its upper end, outwardly inclined brace members attached to the vertical edges of said standard adjacent its upper end, wide horizontal cleats extending on both sides of said standard and brace members adjacent their upper ends, and provided with transverse openings registering with the opening in said standard, and a horizontal base member connecting the lower ends of said brace member and of said standard.

2. In a device for the purpose set forth, in combination, a standard having an opening adjacent its upper end, outwardly inclined brace members attached to the vertical edges of said standard adjacent its upper end, wide horizontal cleats extending on both sides of said standard and brace members adjacent their upper ends, and provided with transverse openings registering with the opening in said standard, and a horizontal base member connecting the lower ends of said brace member and of said standard, and an inclined brace member laterally extended from said standard adjacent its upper end.

In testimony whereof, I affix my signature.

ARTHUR G. GIRARD.